(12) United States Patent
Haseltine et al.

(10) Patent No.: US 11,178,380 B2
(45) Date of Patent: *Nov. 16, 2021

(54) CONVERTING A MONOCULAR CAMERA INTO A BINOCULAR STEREO CAMERA

(71) Applicant: Disney Enterprises, Inc., Burbank, CA (US)

(72) Inventors: Eric C. Haseltine, Silver Spring, MD (US); Joseph L. Olson, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,841

(22) Filed: Oct. 15, 2019

(65) Prior Publication Data

US 2020/0045294 A1 Feb. 6, 2020

Related U.S. Application Data

(63) Continuation of application No. 15/447,684, filed on Mar. 2, 2017, now Pat. No. 10,455,214.

(Continued)

(51) Int. Cl.
*H04N 13/218* (2018.01)
*G02B 13/00* (2006.01)
(Continued)

(52) U.S. Cl.
CPC ....... *H04N 13/218* (2018.05); *G02B 13/0065* (2013.01); *G02B 27/0172* (2013.01); *G03B 17/565* (2013.01); *G03B 35/00* (2013.01); *H04N 13/128* (2018.05); *H04N 13/296* (2018.05); *H04N 13/344* (2018.05);
(Continued)

(58) Field of Classification Search
CPC .. H04N 13/219; H04N 13/128; H04N 13/344; H04N 13/296; H04N 2213/001; G06B 13/0065; G03B 17/565; G03B 35/00; G02B 27/0172; G02B 2027/0127; G02B 2027/0134; G02B 2027/0138; G02B 2027/014

See application file for complete search history.

(56) References Cited

U.S. PATENT DOCUMENTS 5,570,150 A 10/1996 Yoneyama et al.
5,671,450 A 9/1997 Suzuki
(Continued)

FOREIGN PATENT DOCUMENTS

CN 2429845 Y * 5/2001
CN 101546372 A * 9/2009
KR 101255803 B1 * 4/2013

*Primary Examiner* — James R Sheleheda
(74) *Attorney, Agent, or Firm* — Patterson + Sheridan, LLP (57) ABSTRACT

Embodiments include an apparatus comprising a mobile computing device comprising a camera, and a mount removably attached with the mobile computing device to arrange the camera in a first position. The mount comprises a first surface, and two reflective elements spaced apart from each other and having a predefined disposition relative to the first position. The two reflective elements comprise respective convex surfaces extending from the first surface, the respective convex surfaces providing respective optical paths between an object and the camera.

20 Claims, 7 Drawing Sheets

Related U.S. Application Data (60) Provisional application No. 62/302,923, filed on Mar. 3, 2016.

(51) Int. Cl.

| | | |
|---|---|---|
| *G02B 27/01* | (2006.01) | |
| *G03B 35/00* | (2021.01) | |
| *G03B 17/56* | (2021.01) | |
| *H04N 13/344* | (2018.01) | |
| *H04N 13/128* | (2018.01) | |
| *H04N 13/296* | (2018.01) | |

(52) U.S. Cl.
CPC ............ *G02B 2027/014* (2013.01); *G02B 2027/0127* (2013.01); *G02B 2027/0134* (2013.01); *G02B 2027/0138* (2013.01); *H04N 2213/001* (2013.01)

(56) References Cited

U.S. PATENT DOCUMENTS

| | | | |
|---|---|---|---|
| 5,835,133 A | 11/1998 | Moreton et al. | |
| 6,643,396 B1 | 11/2003 | Hendriks et al. | |
| 6,721,500 B2* | 4/2004 | Perisic | H04N 13/218 396/331 |
| 7,274,816 B2 | 9/2007 | Yoshida | |
| 8,908,015 B2 | 12/2014 | Filo et al. | |
| 8,928,738 B2 | 1/2015 | An | |
| 9,060,108 B1* | 6/2015 | Kuffner | G02B 7/1827 |
| 9,118,900 B2 | 8/2015 | Lee | |
| 9,158,183 B2* | 10/2015 | Kakuko | H04N 13/218 |
| 9,466,626 B2 | 10/2016 | Kouyama et al. | |
| 9,667,845 B2* | 5/2017 | Mirlay | G03B 35/10 |
| 9,910,504 B2 | 3/2018 | Dickerson et al. | |
| 10,067,352 B2 | 9/2018 | Alderman | |
| 10,455,214 B2* | 10/2019 | Haseltine | H04N 13/128 |
| 2003/0048416 A1 | 3/2003 | Meltzer | |
| 2003/0072570 A1 | 4/2003 | Seo | |
| 2003/0175024 A1 | 9/2003 | Miyoshi et al. | |
| 2005/0231590 A1 | 10/2005 | Iwasaki | |
| 2005/0259339 A1 | 11/2005 | Yoshida | |
| 2008/0158344 A1* | 7/2008 | Schechterman | H04N 13/211 348/46 |
| 2009/0005112 A1* | 1/2009 | Sorek | H04N 5/2251 455/556.2 |
| 2009/0034086 A1* | 2/2009 | Montgomery | G03B 37/00 359/629 |
| 2010/0013910 A1 | 1/2010 | Farr | |
| 2012/0154552 A1* | 6/2012 | Wakazono | G03B 35/02 348/49 |
| 2013/0147918 A1 | 6/2013 | Kakuko et al. | |
| 2013/0155200 A1 | 6/2013 | Kakuko et al. | |
| 2014/0160242 A1 | 6/2014 | An | |
| 2014/0191356 A1* | 7/2014 | Kouyama | H01L 27/14627 257/443 |
| 2014/0218478 A1 | 8/2014 | Lang et al. | |
| 2014/0354782 A1 | 12/2014 | Lowry | |
| 2014/0362175 A1 | 12/2014 | Filo et al. | |
| 2014/0362194 A1* | 12/2014 | Hirai | H04N 13/373 348/51 |
| 2014/0368616 A1* | 12/2014 | Kasai | H04N 13/296 348/49 |
| 2015/0181089 A1 | 6/2015 | Mirlay | |
| 2015/0189158 A1* | 7/2015 | Hailey | H04N 5/23293 348/333.12 |
| 2015/0348327 A1* | 12/2015 | Zalewski | G06T 15/00 345/419 |
| 2015/0370059 A1 | 12/2015 | Hoegele et al. | |
| 2016/0189432 A1 | 6/2016 | Bar-Zeev et al. | |
| 2016/0209658 A1 | 7/2016 | Zalewski | |
| 2016/0378176 A1* | 12/2016 | Shiu | G06F 3/011 345/633 |
| 2017/0118421 A1* | 4/2017 | Georgiev | G06T 3/4038 |
| 2017/0255017 A1 | 9/2017 | Haseltine | |
| 2017/0257618 A1* | 9/2017 | Haseltine | G03B 17/565 |
| 2017/0359568 A1* | 12/2017 | Georgiev | G02B 27/0025 |
| 2018/0084193 A1 | 3/2018 | Georgiev et al. | |
| 2018/0136473 A1* | 5/2018 | Cobb | G02B 1/11 |
| 2018/0356216 A1 | 12/2018 | Wu et al. | |

* cited by examiner

CONVERTING A MONOCULAR CAMERA INTO A BINOCULAR STEREO CAMERA

CROSS-REFERENCE TO RELATED APPLICATIONS

This application is a continuation of co-pending U.S. patent application Ser. No. 15/447,684 filed Mar. 2, 2017, which claims benefit of U.S. provisional patent application Ser. No. 62/302,923 filed Mar. 3, 2016. Each of the aforementioned related patent applications is herein incorporated by reference in its entirety.

BACKGROUND

Field of the Disclosure

The present disclosure generally relates to computer-based entertainment, and more specifically to optical arrangements suitable for acquiring stereo imagery using a monocular camera.

Description of the Related Art

To accurately register virtual stereoscopic imagery with real, physical objects of an environment, augmented reality (AR)-capable display devices require a stereoscopic image capture capability to suitably perform depth estimation and/or object detection and tracking for the environment in three dimensions. However, for certain implementations of an AR and/or VR (virtual reality)-capable display device, it can be desirable to have a reduced size and/or minimized costs. For compact and/or low-cost implementations, including multiple cameras can be prohibitive, thus making native stereoscopic image capture impractical.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In various embodiments disclosed herein, true stereoscopic image capture for purposes of depth estimation and object detection and tracking may be performed using only one camera. In some cases, the single camera can be embedded in a user's smartphone or other mobile device. In other cases, the single camera may be supplied separately in a consumer product. In conjunction with optical arrangements disclosed herein, a single camera may be used to provide stereoscopic imagery for an extremely wide field of view, e.g., up to 180°.

Figure 1:
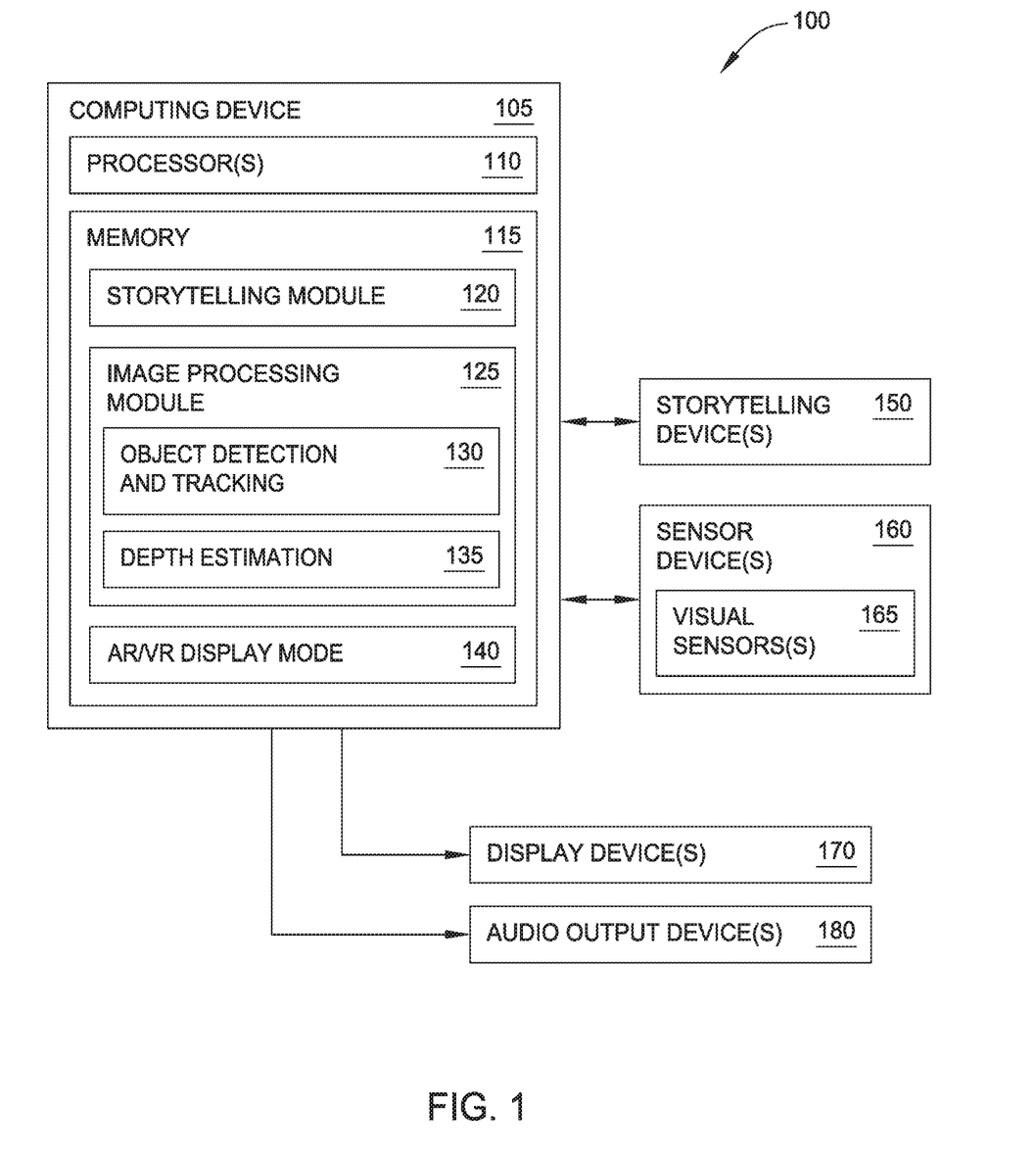
FIG. 1 illustrates an exemplary interactive environment, according to according to embodiments described herein.

FIG. 1 illustrates an exemplary interactive environment, according to one embodiment. Within a system 100, a computing device 105 communicates with one or more storytelling devices 150, one or more sensor devices 160, one or more display devices 170, and one or more audio output devices 180. As will be discussed in greater detail below, the computing device 105 may provide an augmented reality (AR) and/or virtual reality (VR) display functionality for a user in the interactive environment. The computing device 105 may be embodied in any suitable form. In some embodiments, the computing device 105 is a body-worn computing device, e.g., integrated into an assembly worn on the head, arm, etc. of a user. In some embodiments, the computing device 105 comprises a mobile computing device, such as a smartphone, tablet, etc. The mobile computing device may be configured to physically and removably attach with a body-worn assembly.

Computing device 105 comprises, without limitation, a processor 110 and memory 115. The processor 110 generally retrieves and executes programming instructions stored in the memory 115. Processor 110 is included to be representative of a single central processing unit (CPU), multiple CPUs, a single CPU having multiple processing cores, graphics processing units (GPUs) having multiple execution paths, and the like. The memory 115 is generally included to be representative of a random access memory, but may further include non-volatile storage of any suitable type(s).

Memory 115 generally includes program code for performing various functions related to generating and maintaining the storytelling environment. The program code is generally described as various functional "modules" within memory 115, although alternate implementations may have different functions and/or combinations of functions. Within memory 115, a storytelling module 120 is generally configured to generate a story using a selected predetermined story template (e.g., stored in memory 115), and based on a number of identified storytelling devices 150 that are available for participating in the storytelling experience. The storytelling devices 150 can be identified using a registration process performed by any suitable methods of communication. One non-limiting example includes a controller device (which may be a storytelling device 150 or the computing device 105) emitting a first signal such as an infrared (IR) signal, and other storytelling devices 150 transmitting a response signal such as a radio frequency (RF) signal in response to receiving the first signal.

The sensor devices 160 may be of any suitable type(s) and configured to sense information regarding the storytelling environment. Some non-limiting examples of sensor devices 160 include visual sensors 165, pressure sensors, acceleration sensors, and temperature sensors. The visual sensors 165 can include cameras configured to sense visible light and/or infrared light. In some embodiments, the sensor devices 160 may be included with (or within) the computing device 105. For example, where the computing device 105 is a smartphone or tablet device, the sensor devices 160 may include camera(s), inertial motion units (IMUs), etc. that included within the smartphone/tablet device. In some embodiments, the sensor devices 160 comprise sensors that are external to the computing device 105, e.g., a visual sensor 165 included with a head-worn device.

The memory 115 further includes an image processing module 125 configured to perform processing of visual information captured by visual sensors 165. The image processing module 125 may include any number of image processing functions, such as an object detection and tracking sub-module 130 configured to detect physical objects within the interactive environment (e.g., based on edge detection information, color information, and/or other suitable features) and to track the relative location of detected objects over time (e.g., as a user and/or the objects move throughout the interactive environment). The image processing module 125 further includes a depth estimation sub-module 135 configured to dynamically estimate a distance of the detected objects from the user.

The system 100 includes one or more display devices 170, and one or more audio output devices 180. The display devices 170 may include visual displays of any suitable type. The display devices 170 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. In some embodiments, the display devices 170 are included within the computing device 105 (e.g., a main display screen of the smartphone, tablet device, etc.). In other embodiments, the display devices 170 are separate from the computing device 105 but are configured to superimpose virtual imagery onto physical objects in the user's field of view. For example, the display devices 170 may be integrated into a body-worn device such as a headset, and the display devices 170 may be configured as an eyepiece or lens worn in front of the user's eye. In another example, the display devices 170 may be integrated into other devices that are carried or handled by the user, or having any other suitable user interaction during the storytelling experience. For example, while participating in the storytelling experience, the user can carry a toy blaster that includes an optical sight for aiming, and the display devices 170 may be integrated in the optical sight.

The audio output devices 180 may include conventional audio speakers having any suitable form factor (e.g., standalone, integrated in a stereo, headphones, etc.), as well as devices using alternative methods of producing sound perceptible by a user, such as bone conduction transducers in a body-worn device. In some embodiments, the audio output devices 180 are included within the computing device 105 (e.g., speakers of the smartphone, tablet device, etc.). In other embodiments, the audio output devices 180 are separate from the computing device 105. Some non-limiting implementations of the audio output devices 180 are shown in attached Appendix B.

In some embodiments, the computing device 105 is configured to operate in an augmented reality (AR) mode, generally configured to superimpose virtual images such as characters, objects, and/or dynamic visual effects into the user's natural field of view of the environment using a display device 170. The field of view of the user is generally determined using sensor devices 160 such as the visual sensors 165. In some embodiments, the computing device 105 is configured to operate in a virtual reality (VR) mode, generally replacing the user's natural field of view of the environment with virtual imagery using display device 170.

For example, the display device 170 could superimpose a virtual character to appear seated on a physical chair detected within the environment. The display of the virtual character on the display device 170 is dynamically adjusted based on the user's field of view (orientation), the determined depth of the chair from the user, and so forth.

In some embodiments, the computing device 105 is configured to dynamically select one of the AR mode and VR mode based on the sensed characteristics of the environment and/or based on the story generated by the storytelling module. The selection of the AR or VR modes is represented as AR/VR display mode 140 and included in memory 115. For example, the visual sensors 165 may detect that the environment is extremely bright (e.g., when the user is in direct sunlight), which may be difficult for a user to view overlaid information using the display device 170. In another example, a virtual setting of the story generated by the storytelling module 120 specifies a nighttime setting. In these examples, the VR mode may be enabled in order to substantially isolate the user's field of view from the surrounding physical environment and thereby reduce the amount of light received from the environment. In both cases, dynamic selection of the AR/VR display mode 140 can improve the immersive nature of the storytelling environment, whether through ensuring the user is able to suitably view the overlaid information or through providing a more realistic setting consistent with the virtual setting of the story.

Switching between AR and VR modes may be accomplished through any suitable techniques. In some embodiments, a user-worn headset includes a light-blocking assembly comprising cross polarizers that are disposed in front of each of the user's eyes. When one or both of the cross polarizers are rotated, the light from the physical environment that is transmitted to the user's eyes can be selectively reduced, and can substantially isolate the user's field of view from the physical environment (e.g., a VR mode). Rotating the cross polarizers may be performed manually (e.g., the user turns a knob linked with the cross polarizers), or electronically (e.g., a motor receives control signals from computing device 105 based on the AR/VR display mode 140 and rotates the cross polarizers. In other embodiments, the light-blocking assembly includes a partially or fully transparent "see-through" display, such as an OLED or side-lit or naturally lit LCD. The display receives control signals from computing device 105 based on the AR/VR display mode 140 and can selectively darken the display to substantially isolate the user's field of view from the physical environment.

The display devices 170 are generally used within system 100 to provide a compact AR/VR display that may be carried or worn by the user during the storytelling experience. As discussed above, the display devices 170 may include devices that are separate from the display device of a mobile computing device (e.g., a smartphone or tablet device). Implementations of the compact AR/VR display that use a smartphone or other mobile computing device offer several advantages. For example, implementations able to adapt the user's smartphone provide a reduced manufacturing cost of the compact AR/VR display, as no separate computing hardware or display hardware need be included. A camera included in the smartphone may be used as visual sensor 165 to dynamically provide information regarding the physical environment and the user's field of view. Using a smartphone may also provide increased convenience to the user, and may provide a relatively large display for viewing.

A number of considerations influence the design of a compact AR/VR display that uses a mobile computing device. Generally, the compact AR/VR display includes an optical arrangement that is configured to transmit some or all of the display of the mobile computing device to the user's eyes. Depending on the currently selected mode (AR or VR), the optical arrangement is further configured to transmit some or all of the light from the physical environment to the user's eyes. It may be beneficial to design a compact AR/VR display to have a relatively small size and weight. Smaller and lighter body-worn implementations allow for use by younger users or other users with reduced size and/or strength, and are generally less fatiguing during storytelling experience. The positioning of the mobile computing device and/or the optical arrangement can also be selected to reduce a moment on the user. For example, in a head-worn compact AR/VR display, including a smartphone in a position closer to the user's head provides a smaller moment (e.g., corresponding to strain on the neck or upper body) than an implementation in which the smartphone is positioned further from the user's head. A compact (small-sized) implementation also reduces manufacturing costs through reduced material and process requirements. A compact implementation may also be more aesthetically pleasing for users, when compared with a large or bulky implementation.

Using a mobile computing device in conjunction with an optical arrangement can provide the user a reasonably good field of view, which enhances the immersive nature of the interactive environment. Generally, the size of the user's field of view is proportional to size of the elements included in the optical arrangement for a particular distance from the user's eyes.

Figure 2:
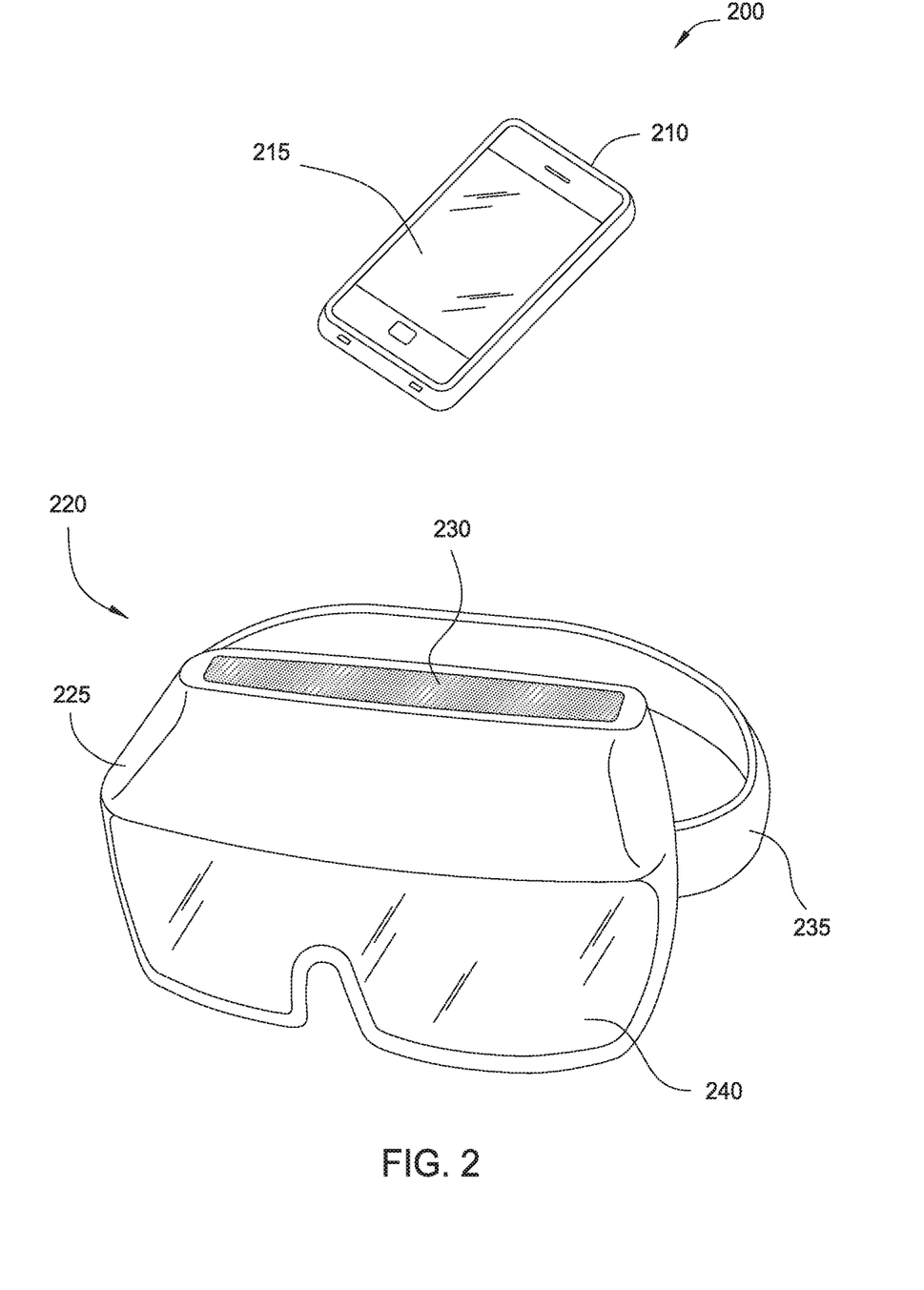
FIG. 2 is a diagram illustrating an AR/VR headset configured to interact with a mobile computing device, according to embodiments described herein.

FIG. 2 is a diagram illustrating an AR/VR headset configured to interact with a mobile computing device, according to embodiments described herein. As shown, the diagram depicts a mobile computing device 210 and an AR/VR-capable display device 200 in the form of an AR/VR headset 220. The AR/VR headset 220 generally includes a mount element 225 (or "mobile device adapter"), a headstrap 235, and a mirrored lens 240. The mount element 225 defines an opening 230 into which the mobile computing device 210 is received. Generally, insertion of the mobile computing device 210 into the opening 230 provides a removable attachment of the mobile computing device 210 with the mount element 225 and further arranges the display 215 (representing an example of the display device 170 of FIG. 1) with a predefined position. In the predefined position, the display 215 has a suitable orientation relative to optical components (not shown) included in the AR/VR headset 220. The mount element 225 may include any suitable means for removably attaching the mobile computing device 210. The mount element 225 is further configured to hold or retain the mobile computing device 210 with a desired position and orientation relative to a wearer of the AR/VR headset 220.

The light generated by the display 215 of the mobile computing device 210 (e.g., based on the display signals 175 of FIG. 1) is redirected through the optical components of the AR/VR headset 220 so that the light can be seen by a wearer of the AR/VR headset 220. For example, the generated light could pass through a beam-splitter and reflect off the mirrored lens 240 and into the wearer's eyes. Thus, virtual objects that are displayed using the display 215 appear as if present within the physical environment of the viewer. Advantageously, by leveraging the hardware resources of the mobile computing device 210, the AR/VR headset 220 can be produced and sold at reduced costs, relative to other AR devices containing dedicated computer processors, display devices, and so forth.

Figure 3:
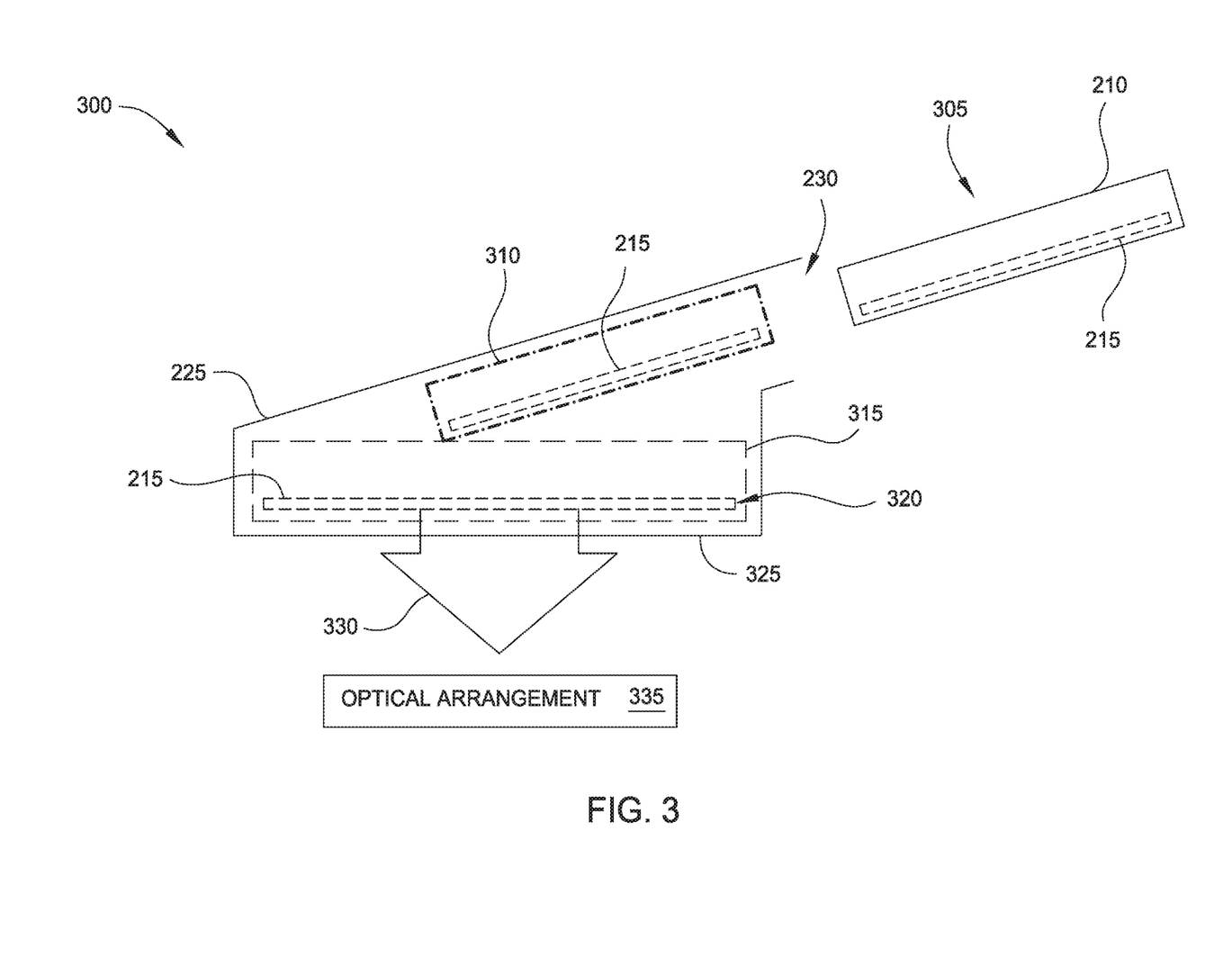
FIG. 3 is a diagram illustrating attachment of a mobile computing device with a mount element, according to embodiments described herein.

FIG. 3 is a diagram illustrating attachment of a mobile computing device with a mount element, according to embodiments described herein. More specifically, diagram 300 depicts an exemplary sequence for inserting the mobile computing device 210 into the mount element 225. While shown as a single element, the mount element 225 may be formed of one or more elements of any material(s) having suitable strength for retaining the mobile computing device 210. In some embodiments, the mount element 225 is formed of a plastic material, which advantageously provides a lighter display device.

The mobile computing device 210 is inserted through an opening 230 formed in the mount element 225. The intermediate position 310 represents possible positioning of the mobile computing device 210 before reaching a predefined final position 315. At the predefined final position 315 of the mobile computing device 210, the display 215 of the mobile computing device 210 has a predefined position 320 relative to the optical arrangement 335.

A lower surface 325 of the mount element 225 is generally optically transmissive of light 330 generated by the display 215. In some embodiments, the lower surface 325 is formed of an optically transmissive material, such as a plastic or glass, through which light 330 from the display 215 is transmitted. In other embodiments, the lower surface 325 defines an opening through which light 330 from the display 215 is transmitted. For example, the lower surface 325 may support the mobile computing device 210 around a periphery of the mobile computing device 210.

Although not explicitly shown, the mount element 225 may include further elements for removably attaching the mobile computing device 210 with the mount element 225. For example, a press fit may be formed between the mobile computing device 210 and mount element 225 using adjustable corner piece(s), a sliding tray with guide plug, toggle pin(s), a stepped slot, a replaceable tray, etc. For example, the mobile computing device 210 may be inserted into a replaceable tray or other suitable carrier member, which is then inserted to the mount element 225 to thereby arrange the display 215 with the predefined position 320. In this way, different carrier members may be used to accommodate different types of mobile computing devices 210 for a particular mount element 225.

The removable attachment of the mobile computing device 210 with the mount element 225 may have any suitable orientation within an associated display device. The elements of the optical arrangement 335 collectively define a field of view relative to a predefined optical reference point, and the display device is generally designed such that the eye(s) of the viewer is aligned with the optical reference point. To support an AR capability of the display device, the mobile computing device 210 and mount element 225 are generally disposed outside of the field of view to allow a viewer to observe the physical environment through the optical arrangement 335. For example, for a head-worn display device in which a line of sight of the viewer corresponds to the field of view of the optical arrangement 335, the mobile computing device 210 and mount element 225 may be positioned above, below, or to a side of the viewer's line of sight.

Figure 4:
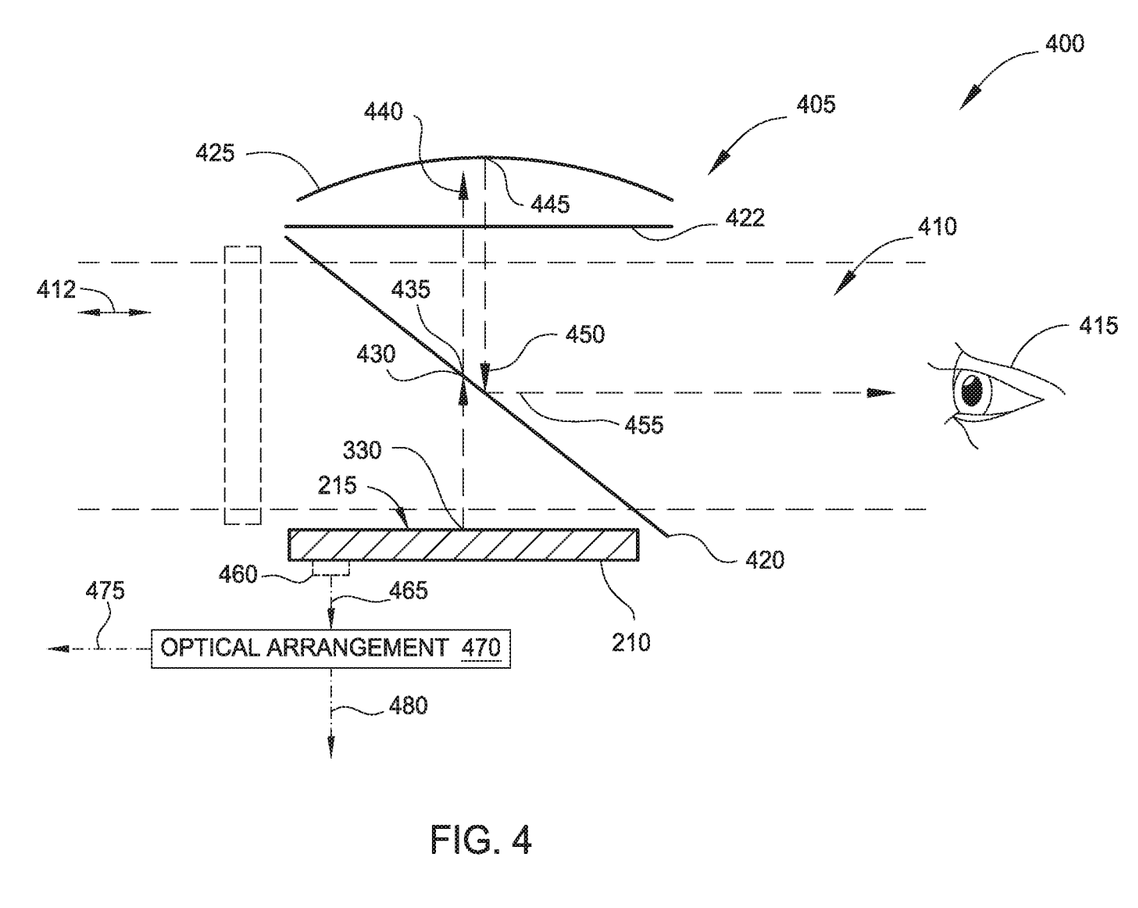
FIG. 4 is a diagram illustrating an exemplary implementation of a compact AR/VR display device, according to embodiments described herein.

FIG. 4 illustrates an exemplary implementation of a compact AR/VR display device 400, according to one embodiment. The display device 400 illustrates a smartphone (i.e., one example of a mobile computing device 210) and an optical arrangement 405 that is configured to reflect at least a portion of the display 215 of the smartphone to an eye 415 of a viewer. The elements of the optical arrangement 405 collectively define a field of view 410 relative to a predefined optical reference point. The display device 400 is generally designed such that the eye 415 of the viewer is aligned with the optical reference point.

Although not shown, the optical arrangement 405 may include a mask that is configured to block light from some of the display area of display 215 and/or from other portions of the smartphone to prevent these portions from being seen by the viewer. For example, a mask may be provided to prevent the smartphone edges from being visible within the field of view 410, which tends to distract the viewer from the immersive nature of the interactive environment.

As shown, the smartphone is arranged with its display 215 facing in an upward direction. In some embodiments, the smartphone is removably attached with the optical arrangement 405 in the display device 200, which may be body-worn or carried by the viewer. The removable attachment of the smartphone allows its display 215 to maintain a desired orientation with the elements of the optical arrangement 405 despite movement of the viewer during usage. Note that the structural elements attaching portions of the optical arrangement 405, the smartphone, and/or the viewer are not depicted for simplicity. For example, the display device 200 may include a flexible headstrap allowing comfortable wear by the viewer on his or her head. The light 330 (or "imagery") generated by the display 215 is transmitted in the upward direction towards a first mirror element 425. In some embodiments, the first mirror element 425 has a positive optical power and the imagery from the display 215 is typically focused between about 1 meter and optical infinity.

Based on the light 330, a first incident light 430 is incident on a beam splitter element 420. The beam splitter element 420 is disposed within the field of view 410 and configured to transmit a first portion 435 of the first incident light 430. In some embodiments, the beam splitter element 420 reflects 50% of first incident light 430 and transmits 50% of first incident light 430. Alternative implementations of the beam splitter element 420 may have differing percentage ratios. A second incident light 440 based on the transmitted first portion 435 (e.g., 50% of the first incident light 430) is incident upon the first mirror element 425, and a second portion 445 of the second incident light 440 is reflected off the first mirror element 425 toward the beam splitter element 420. Generally, the first mirror element 425 is 100% front surface coated to reflect substantially all of the second incident light 440. Alternative implementations of the first mirror element may have different reflectivity. A third incident light 450 based on the second portion 445 is incident upon the beam splitter element 420, and the beam splitter element 420 reflects a third portion 455 of the third incident light 450 onto the field of view 410. In some embodiments, the beam splitter element 420 reflects 50% of the third incident light 450 to the eye 415 of the viewer. Therefore, in one embodiment, approximately 25% (50% reflected of the 50% transmitted through the beam splitter element) of the light power generated by the display 215 is transmitted to the eye of the viewer.

As shown, a camera 460 of the smartphone is included on an opposite surface from the display 215. In another implementation, the camera 460 of the smartphone may be included on the same surface as the display 215. The display device 400 further includes an optical arrangement 470 that is configured to acquire stereoscopic imagery of an object using the camera 460. The optical arrangement 470 has a predefined disposition relative to a predefined position of the camera 460. In some embodiments, components of the optical arrangement 470 are configured to reorient a sensing axis 465 of the camera 460. For example, and as shown, the camera 460 senses via the optical arrangement 470 in the forward direction along sensing axis 475, which corresponds to an axis 412 of the field of view 410. Other directions of reorientation are possible. In other embodiments, the optical arrangement 470 maintains the sensing axis 465 of the camera 460 (shown as sensing axis 480). No matter the orientation of the sensing axis, the camera 460 is able to acquire visual information for the environment for performing optical detection and tracking, depth estimation, and so forth.

The display device 400 further includes a light-blocking assembly 485 disposed within the field of view 410. In some embodiments, the light-blocking assembly 485 comprises cross polarizers. When one or both of the cross polarizers are rotated, the amount of light from the physical environment that is transmitted to the viewer's eyes (e.g., through the beam splitter element 420) can be controlled to substantially isolate the field of view 410 from the physical environment (e.g., corresponding to a selected VR mode). Rotating the cross polarizers may be performed manually (e.g., the viewer turns a knob linked with the cross polarizers) or electronically. For example, a motor linked with the cross polarizers receives control signals from an associated computing device (such as the mobile computing device 210) and rotates the cross polarizers based on a selected AR or VR display mode. In other embodiments, the light-blocking assembly 485 includes a partially or fully transmissive "see-through" display, such as an OLED or a side-lit or naturally lit LCD. In this case, the partially or fully transmissive display receives control signals from the associated computing device and selectively darkens the display based on the selected AR or VR display mode.

Note that although the optical arrangements of FIG. 4 is shown relative to a single eye 415 of the viewer, implementations of the display device 400 can include independent optics for each eye of the viewer. Further, in some embodiments, implementations of the display device 400 may include some independent optics (e.g., one per eye) and some shared optics (e.g., one for both eyes). In one example, a single beam splitter element 420 may be shared by two independent lens systems (i.e., two independent positive optical power mirrors) corresponding to the viewer's two eyes. Note additionally that alternative implementations of display device 400 may include one or more separate display devices (i.e., not included in the smartphone) and or one or more separate cameras (or other visual sensors). Further, the features described with respect to a particular implementation may be beneficially applied to other implementations without requiring an explicit recitation.

Figures 5A, 5B:
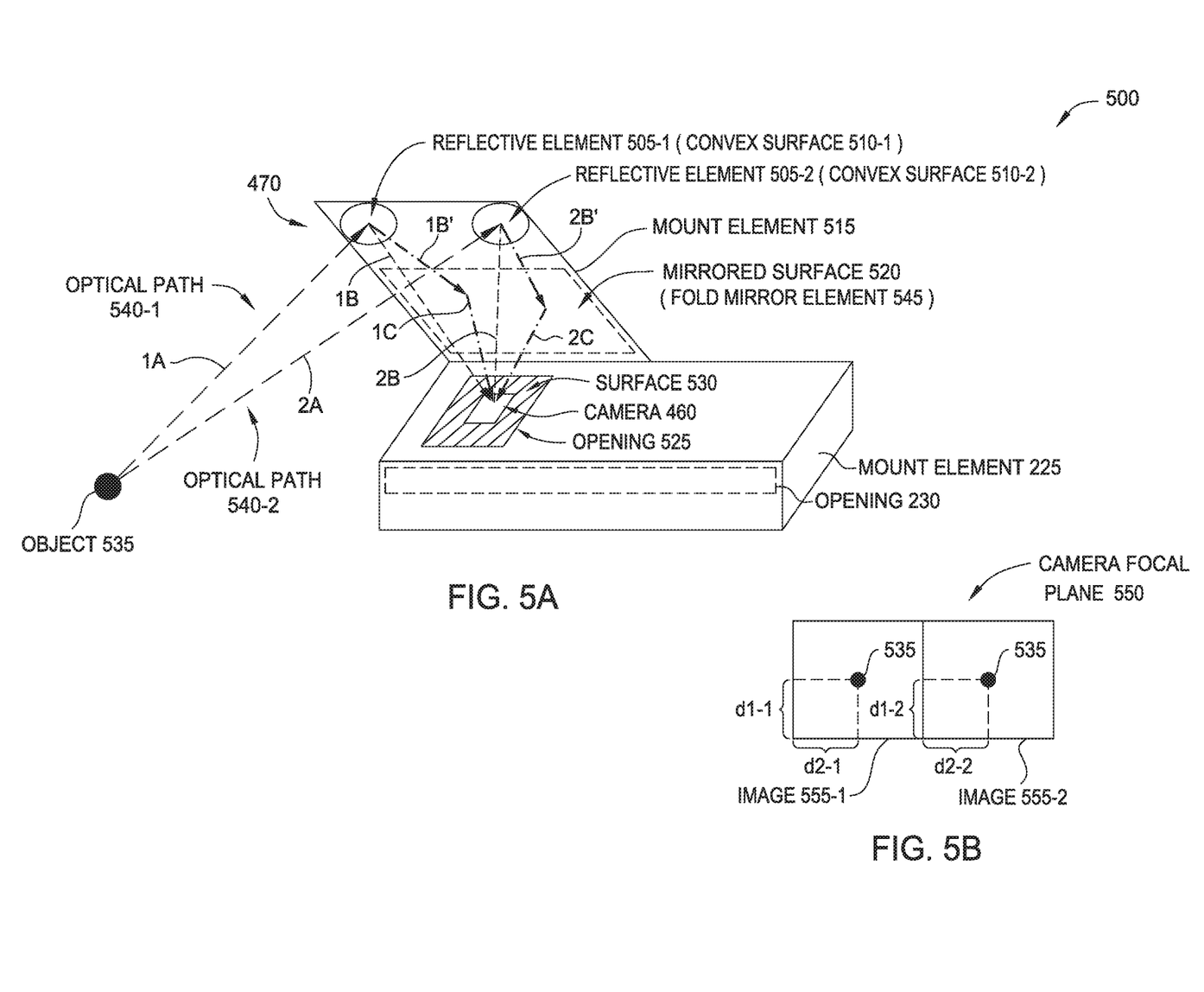
FIGS. 5A and 5B illustrate an arrangement of an exemplary optical system, according to embodiments described herein.

FIGS. 5A and 5B illustrate an arrangement of an exemplary optical system, according to embodiments described herein. Optical system 500 may be used in conjunction with other embodiments, such as the mobile computing device 210 and/or the mount element 225 depicted in FIGS. 2 and 3, and/or the display device 400 depicted in FIG. 4.

The optical system 500 comprises a camera 460 defining a camera focal plane 550 (illustrated in FIG. 5B). As shown, the camera focal plane 550 is substantially parallel to the surface 530 at which the camera 460 is disposed, although this is not a requirement. For example, the camera 460 may have a different orientation or may have a dynamically determined orientation.

The optical system 500 further comprises the optical arrangement 470. As shown, optical arrangement 470 comprises a plurality of reflective elements (i.e., a first reflective element 505-1 and a second reflective element 505-2) that are coupled with a mount element 515. In turn, the mount element 515 is coupled with the mount element 225, such that the optical arrangement 470 has a predefined disposition relative to a predefined position of the camera 460.

As shown, the mount element 225 defines an opening 525 through which a portion of a surface 530 of the mobile computing device is exposed. The camera 460 is arranged at the portion of the surface 530. The first reflective element 505-1 is arranged along a first optical path 540-1 defined between an object 535 and the camera 460, and the second reflective element 505-2 is arranged along a second optical path 540-2 defined between the object 535 and the camera 460.

In the first optical path 540-1, first light is received from the object 535 along segment 1A, and depending on the configuration of the optical arrangement 470, the first light is reflected as first reflected light along one of segment 1B and segment 1B'. In one embodiment, substantially all of the first reflected light is directed onto the camera focal plane 550 along segment 1B. In another embodiment, at least a portion of the first reflected light propagating along segment 1B' is reflected by a mirrored surface 520 before being directed onto the camera focal plane 550 along segment 1C.

In the second optical path 540-2, second light is received from the object 535 along segment 2A, and depending on the configuration of the optical arrangement 470, the second light is reflected as second reflected light along one of segment 2B and segment 2B'. In one embodiment, substantially all of the second reflected light is directed onto the camera focal plane 550 along segment 2B. In another embodiment, at least a portion of the second reflected light propagating along segment 2B' is reflected by the mirrored surface 520 before being directed onto the camera focal plane 550 along segment 2C. Although not explicitly shown, other optical elements may be included within the optical arrangement 470 and arranged along the first optical path 540-1 and/or the second optical path 540-2. The mirrored surface 520 generally allows the first optical path 540-1 and/or second optical path 540-2 to be folded, which advantageously can result in a smaller overall size of the optical system 500 and/or a device within which the optical system 500 is included (such as an AR/VR headset).

As shown, the first reflective element 505-1 defines a first convex surface 510-1, and the second reflective element 505-2 defines a second convex surface 510-2. The convex surfaces 510-1, 510-2 may have any suitable shape, such as spherical, hemispherical, conical, elliposoidal, hemiellipsoidal, or other shapes such as spoon-shaped. The first convex surface 510-1 is configured to reflect the first light received from the object 535, and the second convex surface 510-2 is configured to reflect the second light received from the object 535.

In alternate embodiments, the first reflective element 505-1 and/or the second reflective element 505-2 may comprise planar surfaces configured to reflect the corresponding first light or second light from the object 535. Generally, using convex surfaces 510-1, 510-2 can provide a relatively greater field of view than planar surfaces, but the light directed onto the camera focal plane 550 using convex surfaces 510-1, 510-2 may have relatively greater barrel distortion. Thus, using planar surfaces for the first reflective element 505-1 and/or the second reflective element 505-2 can result in less intensive image processing requirements.

An example of stereoscopic imagery acquired at the camera focal plane 550 is depicted in FIG. 5B. As shown, a first image 555-1 represents first light (or first imagery), e.g., acquired from the first optical path 540-1, and a second image 555-2 represents second light (or second imagery), e.g., acquired from the second optical path 540-1. Although not explicitly shown, the combined imagery from the first optical path 540-1 and the second optical path 540-2 that is received at the camera focal plane 550 can be separated into the first image 555-1 and the second image 555-2 using image processing techniques, which will be known to the person of ordinary skill in the art. The object 535 is depicted in each of the first image 555-1 and the second image 555-2. Based on the relative positioning of the object 535 within the first image 555-1 and second image 555-2 (reflected in distance values d1-1, d2-1, d1-2, d2-2), at least one of depth information for the object 535 and positional information for the object 535 may be determined. In AR-capable devices, the depth information and/or positional information determined for the object 535 may generally be used to display virtual imagery with a desired positioning relative to the object 535.

Figure 6A:
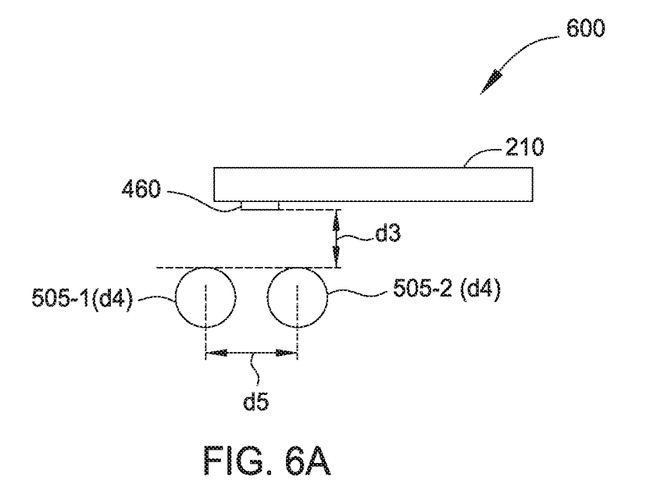
FIGS. 6A and 6B illustrate exemplary spacing of components of an optical system, according to embodiments described herein.
Figure 6B:
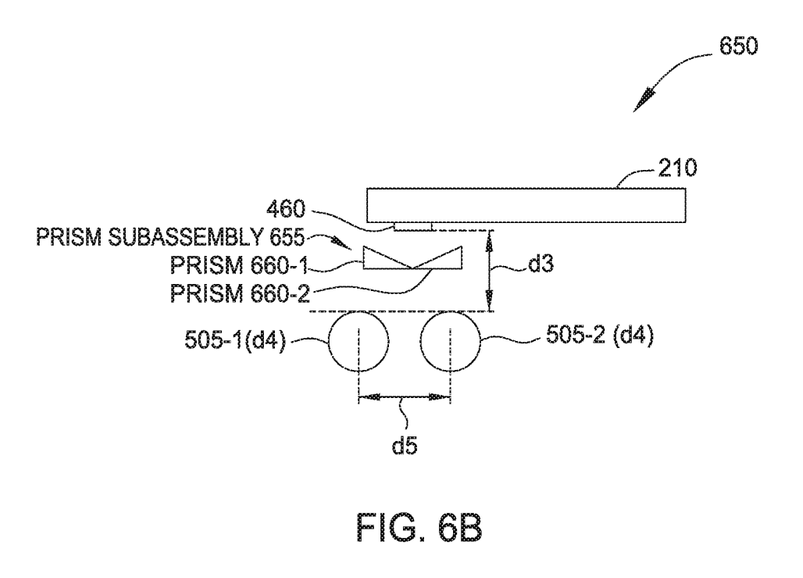

FIGS. 6A and 6B illustrate exemplary spacing of components of an optical system, according to embodiments described herein. More specifically, arrangements 600, 650 may be used in conjunction with other embodiments, such as the optical system 500 depicted in FIG. 5.

Arrangement 600 illustrates an exemplary positioning and spacing of the reflective elements 505-1, 505-2, according to one embodiment. As shown, each reflective element 505-1, 505-2 is approximately spherical and has diameter represented by d4. The lens of the camera 460 is a distance d3 from an imaginary plane connecting the top portions of the reflective elements 505-1, 505-2. The reflective elements 505-1, 505-2 are separated by a center-line distance d5. In one example implementation, the distance d3 is approximately 51 millimeters (mm), the diameter d4 is approximately 30 mm, and the center-line distance d5 is approximately 57 mm. Other values of d3, d4, and d5 are also possible, whether scaled in approximately the same proportion as the example implementation (i.e., 51:30:57) or in different proportions.

Arrangement 650 illustrates an exemplary positioning and spacing of the reflective elements 505-1, 505-2 using a prism subassembly 655, according to one embodiment. As shown, the prism subassembly 655 is disposed between the camera 460 and the reflective elements 505-1, 505-2. The prism subassembly 655 is configured to shift images of the relatively widely-spaced reflective elements 505-1, 505-2 inwards onto the camera focal plane, which effectively increases the field of view of the camera 460 while avoiding the normal distortion of a fisheye lens and the loss of resolution occurring with a lens having a wider field of view.

As shown, the prism subassembly 655 includes a first prism element 660-1 arranged between the camera 460 and the first reflective element 505-1, and a second prism element 660-2 arranged between the camera 460 and the second reflective element 505-2. The prism elements 660-1, 660-2 may be integrally formed, or may be distinct elements that are joined together.

In one example implementation, the prism elements 660-1, 660-2 are arranged about 20 mm from the lens of the camera 460, although other distances are possible. The center-line distance d5 separating the reflective elements 505-1, 505-2 is approximately 76 mm, although other distances are possible.

Generally, a greater center-line distance d5 between the reflective elements 505-1, 505-2 results in a greater range and resolution of stereo sensing capability. However, there is an upper limit on the center-line distance d5 while still providing a full binocular panoramic view, as beyond a certain distance the outer-most boundary of each reflective element 505-1, 505-2 will disappear from the field of view of the camera 460, which restricts the total field of view of the optical system. The example center-line distance of 76 mm represents a tradeoff of stereo range and resolution and total system field of view for the embodiment. In other implementations, the distance d3, diameter d4, and/or orientation of the reflective elements 505-1, 505-2 may differ, such that the center-line distance d5 may be more or less than 76 mm. Using the prism subassembly 655 beneficially allows the overall height of the arrangement 650 (as shown, along the vertical direction) to be substantially reduced. For example, the height of arrangement 650 may be reduced to approximately one-third (⅓) the height of arrangement 600. This may result in a smaller overall size of the optical system 500 and/or a device within which the optical system 500 is included (such as an AR/VR headset).

Figure 7:
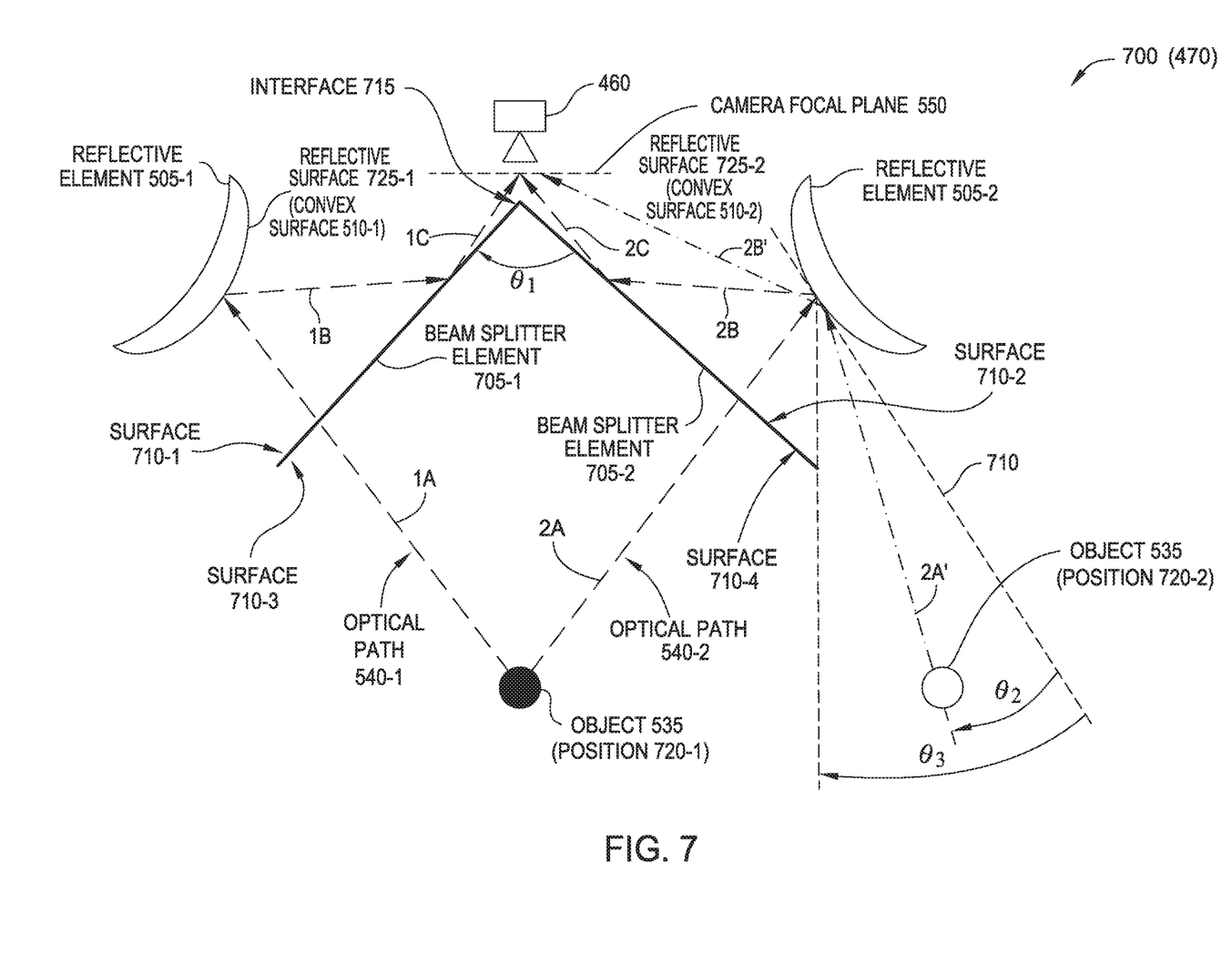
FIG. 7 is a diagram illustrating an exemplary optical arrangement including multiple beam splitter elements, according to embodiments described herein.

FIG. 7 is a diagram illustrating an exemplary optical arrangement including multiple beam splitter elements, according to embodiments described herein. Optical arrangement 700 provides one example of the optical arrangement 470 depicted in FIG. 4, and may be used in conjunction with other embodiments, such as the optical system 500 depicted in FIG. 5.

The optical arrangement 700 includes the first reflective element 505-1 arranged along the first optical path 540-1, and the second reflective element 505-2 arranged along the second optical path 540-2. As shown, each reflective element 505-1, 505-2 comprises a respective reflective surface 725-1, 725-2. As shown, the reflective surfaces 725-1, 725-2 correspond to convex surfaces 510-1, 510-2, but alternately the reflective surfaces 725-1, 725-2 may correspond to planar surfaces.

The optical arrangement 700 further comprises a first beam splitter element 705-1 arranged along the first optical path 540-1, and a second beam splitter element 705-2 arranged along the second optical path 540-2. Each of the first beam splitter element 705-1 and the second beam splitter element 705-2 is partially transmissive. The first beam splitter element 705-1 defines a first surface 710-1 that is configured to direct light from the first optical path 540-1 onto the camera focal plane 550. The second beam splitter element 705-2 defines a second surface 710-2 configured to direct light from the second optical path 540-2 onto the camera focal plane 550.

The second beam splitter element 705-2 has a predefined disposition relative to the first beam splitter element 705-1. In some embodiments, the first beam splitter element 705-1 and the second beam splitter element 705-2 are each substantially planar, and are joined together at an interface 715 at substantially a 90-degree angle (i.e., angle $\theta_1 \cong 90°$. Other configurations and/or orientations are also possible.

The combination of the first beam splitter element 705-1 and the second beam splitter element 705-2 with the 90° orientation provides two partial focal planes out of the single camera focal plane 550. Each partial focal plane provides slightly less than half the coverage of the camera focal plane 550, and receives corresponding left-side or right-side imagery through one or more reflections occurring within the optical arrangement 700.

When at a first position 720-1, the object 535 provides first light that propagates along segments 1A, 1B, and 1C of optical path 540-1 to the camera focal plane 550, and provides second light that propagates along segments 2A, 2B, and 2C of optical path 540-2 to the camera focal plane 550. In some embodiments, the first light from the object 535 is transmitted through a third surface 710-3 of the first beam splitter element 705-1 that is opposing the first surface 710-1. The transmitted light is reflected off the reflective surface 725-1 and subsequently reflects off the first surface 710-1 onto the camera focal plane 550. The second light from the object 535 is transmitted through a fourth surface 710-4 of the second beam splitter element 705-2 that is opposing the second surface 710-2. The transmitted light is reflected off the reflective surface 725-2 and subsequently reflects off the second surface 710-2 onto the camera focal plane 550.

As shown, light from the object 535 is captured through separate optical paths 540-1, 540-2 and imaged onto the camera focal plane 550 as two distinct images having a different perspective. The amount of parallax appearing due to the different perspective may be preferentially adjusted by changing the relative spacing of the reflective elements 505-1, 505-2. Generally, a greater separation of the reflective elements 505-1, 505-2 with respect to the distance imaged corresponds to a greater image disparity for purposes of computing object depth. One or more computer processors provided with imagery from the split raster of the camera focal plane 550 may analyze the two images to compute the depth of the object 535 within the field of view.

As shown, the interface 715 of the first beam splitter element 705-1 and the second beam splitter element 705-2 is arranged in front of the camera 460. For many implementations, the f-number (or focal ratio, f-ratio, f-stop, F #, etc.) of the optical arrangement 700 is sufficiently large that the two reflective elements 505-1, 505-2 operate to effectively halve the field of view of the camera 460. In some cases, the interface 715 appears within the camera focal plane 550 as a vertically-oriented obstruction, as the edges of the first beam splitter element 705-1 and the second beam splitter element 705-2 occupy a finite, but acceptably small portion of the camera focal plane 550. The portion of the camera focal plane 550 having the substantially vertical obstruction (e.g., substantially a center portion of the camera focal plane 550) may be minimized by precision chamfering and beveling of the edges of the first beam splitter element 705-1 and the second beam splitter element 705-2.

The center-line artifact can also be minimized by increasing the f-number of the optical arrangement 700, such that the interface 715 of the two beam splitter elements 705-1, 705-2 essentially becomes a focal plane rather than a blurred-out aperture obstacle. In some embodiments, the reflective elements 505-1, 505-2 are each arranged to provide a predefined f-number of the optical arrangement 700 that is selected to provide a predefined visibility reduction of the interface 715 in the acquired stereoscopic imagery.

In some embodiments, one or more of the reflective elements 505-1, 505-2 are further configured to reflect light directly onto the camera focal plane 550 for object(s) 535 that are at a relatively shallow angle to the reflective elements 505-1, 505-2. For example, when at a second position 720-2, the object 535 is arranged relative to the reflective surface 725-2 at an angle $\theta_2$ that is less than a predefined angle value $\theta_3$. In some cases, this condition corresponds to the object 535 being further to the left or to the right (as shown) than the extent of the two beam splitter elements 705-1, 705-2 along this direction. In this arrangement, the object 535 provides second light that propagates along segments 2A', and 2B' of the second optical path 540-2 to the camera focal plane 550. Although not explicitly shown, at the second position 720-2 the object 535 also provides first light that propagates in a similar manner as to optical path 540-1 (i.e., transmitted through the beam splitter element 705-1, reflected off the reflective surface 725-1, and reflected off the surface 710-1 onto the camera focal plane 550).

As discussed above, one or more computer processors provided with imagery from the split raster of the camera focal plane 550 may analyze the two images to determine depth information and/or location information for the object 535. In some embodiments, the one or more computer processors are configured to determine the depth information and/or location information by using first image processing operations upon determining the reflective element 505-2 reflects the second light onto the camera focal plane 550. The one or more computer processors are further configured to use second image processing operations upon determining the second surface 710-2 of the second beam splitter element 705-2 directs the second light onto the camera focal plane 550. Stated another way, to determine depth information and/or location information, the one or more computer processors perform different image processing operations when the object is at the first position 720-1 than when the object is at the second position 720-2.

In the preceding, reference is made to embodiments of the disclosure. However, it should be understood that the disclosure is not limited to specific described embodiments. Instead, any combination of the preceding features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. An apparatus comprising:
a mobile computing device comprising a camera; and
a mount removably attached with the mobile computing device to arrange the camera in a first position, the mount comprising:
  a first mount element to which the mobile computing device is removably attached;
  a second mount element comprising a first surface, wherein the second mount element is coupled with the first mount element at a proximal end of the first surface;
  two reflective elements spaced apart from each other and having a predefined disposition relative to the first position, wherein the two reflective elements comprise respective convex surfaces extending from the first surface at a distal end thereof, the respective convex surfaces providing respective optical paths between an object and the camera; and
  a fold mirror included in the respective optical paths between the object and the camera.

2. The apparatus of claim 1, wherein the first mount element comprises:
a second surface coupled with the proximal end of the first surface,
wherein the second surface defines an opening through which the camera is exposed.

3. The apparatus of claim 1, wherein the first surface comprises a planar surface.

4. The apparatus of claim 3, wherein the fold mirror is coupled with the planar surface.

5. The apparatus of claim 3, wherein the planar surface is a mirrored surface, and wherein the mirrored surface operates as the fold mirror.

6. The apparatus of claim 1, wherein the mobile computing device comprises a display arranged by the mount in a second position, the apparatus further comprising:
an optical arrangement having a predefined disposition relative to the second position, the optical arrangement defining a field of view for displaying light generated by the display.

7. The apparatus of claim 1, further comprising:
a prism subassembly arranged in the respective optical paths between the two reflective elements and the camera,
wherein the prism subassembly is configured to increase a field of view of the camera.

8. The apparatus of claim 7, wherein the prism subassembly comprises:
a first prism arranged between the camera and one of the two reflective elements; and
a second prism arranged between the camera and the other of the two reflective elements.

9. An augmented reality (AR)-capable headset comprising:
a display arranged in a first position;
a single camera arranged in a second position relative to the first position;
a first surface facing the single camera and extending away from the single camera;
two reflective elements spaced apart from each other and having a predefined disposition relative to the second position, wherein the two reflective elements comprise respective convex surfaces extending from the first surface at a distal end thereof, the respective convex surfaces providing respective optical paths between an object and the single camera; and
a fold mirror included in the respective optical paths between the object and the camera.

10. The AR-capable headset of claim 9, further comprising:
an optical arrangement having a predefined disposition relative to the first position, the optical arrangement defining a field of view for displaying light generated by the display.

11. The AR-capable headset of claim 9, further comprising:
a mount configured to arrange the display in the first position.

12. The AR-capable headset of claim 11, wherein the mount is further configured to arrange the single camera in the second position.

13. The AR-capable headset of claim 12, wherein the display and the single camera are included in a mobile computing device.

14. The AR-capable headset of claim 9, wherein the first surface comprises a planar surface.

15. The AR-capable headset of claim 14,
wherein the planar surface is a mirrored surface, and
wherein the mirrored surface operates as the fold mirror.

16. A system comprising:
a mobile computing device comprising:
  a camera; and
  one or more computer processors; and
a mount removably attached with the mobile computing device to arrange the camera in a first position, the mount comprising:
  a first surface facing the camera and extending away from the camera;

two reflective elements spaced apart from each other and having a predefined disposition relative to the first position, wherein the two reflective elements comprise respective convex surfaces arranged at a distal end of, and extending from, the first surface, the respective convex surfaces providing respective optical paths between an object and the camera; and a fold mirror included in the respective optical paths between the object and the camera, wherein the one or more computer processors are configured to determine, using light received via the respective optical paths, at least one of depth information and positional information of the object.

17. The system of claim 16, wherein the mobile computing device further comprises a display, and wherein the one or more computer processors are further configured to control, using the at least one of the depth information and the positional information, the display to display one or more virtual objects relative to the object.

18. The system of claim 17, further comprising:

an optical arrangement having a predefined disposition relative to a second position of the display, the optical arrangement defining a field of view for displaying light generated by the display.

19. The AR-capable headset of claim 14, wherein the fold mirror is coupled with the planar surface.

20. The system of claim 16, wherein the first surface comprises a planar surface, and
wherein the fold mirror is coupled with the planar surface.

* * * * *